(12) United States Patent
North Morris

(10) Patent No.: US 12,442,717 B2
(45) Date of Patent: Oct. 14, 2025

(54) INTERFEROMETER WITH AUXILIARY LENS FOR MEASUREMENT OF A TRANSPARENT TEST OBJECT

(71) Applicant: Onto Innovation Inc., Wilmington, MA (US)

(72) Inventor: Michael B. North Morris, Tucson, AZ (US)

(73) Assignee: Onto Innovation Inc., Wilmington, MA (US)

( * ) Notice: Subject to any disclaimer, the term of this patent is extended or adjusted under 35 U.S.C. 154(b) by 299 days.

(21) Appl. No.: 18/105,749

(22) Filed: Feb. 3, 2023

(65) Prior Publication Data

US 2024/0264035 A1 Aug. 8, 2024

(51) Int. Cl.
*G01M 11/02* (2006.01)

(52) U.S. Cl.
CPC .... *G01M 11/0207* (2013.01); *G01M 11/0228* (2013.01)

(58) Field of Classification Search
CPC ............. G01M 11/0207; G01M 11/0228
See application file for complete search history.

(56) References Cited

U.S. PATENT DOCUMENTS

| | | |
|---|---|---|
| 5,151,752 A | 9/1992 | Oono et al. |
| 5,355,210 A * | 10/1994 | Keren ................ G01M 11/0228 356/124 |
| 5,737,081 A * | 4/1998 | Freischlad ........... G01B 11/306 356/511 |
| 5,883,717 A * | 3/1999 | DiMarzio ................ G01J 9/02 356/491 |
| 6,870,652 B2 | 3/2005 | Suhara et al. |
| 7,688,453 B2 | 3/2010 | Williby et al. |
| 8,427,636 B2 | 4/2013 | Prince et al. |
| 9,696,536 B2 * | 7/2017 | Nobis ...................... G02B 21/33 |
| 2004/0027576 A1 * | 2/2004 | De Groot ........... G01B 9/02063 356/498 |

(Continued)

FOREIGN PATENT DOCUMENTS

| | | |
|---|---|---|
| JP | H08304229 A | 11/1996 |
| JP | 2003083710 A | 3/2003 |

(Continued)

OTHER PUBLICATIONS

International Search Report and Written Opinion dated May 20, 2024, from PCT/US2024/014281, filed Feb. 2, 2024.

(Continued)

*Primary Examiner* — Michelle M Iacoletti
*Assistant Examiner* — Maher Yazback
(74) *Attorney, Agent, or Firm* — Paradice & Li LLP

(57) ABSTRACT

A Mach-Zehnder interferometer is configured for measuring a transparent test object, such as measuring the power of a lens. The test object, for example, may be an interocular lens. The interferometer splits an illumination beam into a reference beam and test beam. The test beam is transmitted through the test object and one or more auxiliary lenses. The configuration and respective positions of the test object and one or more auxiliary lenses are configured to collimate the test beam. The one or more auxiliary lenses and/or test object may be positioned at different relative distances. The reference beam and test beam are recombined and the interference patterns imaged for different relative distances between the test object and one or more auxiliary lenses. A lens power may be determined based on the interferometric power measurements from the images and the change in the relative distances used for the images.

20 Claims, 7 Drawing Sheets

(56) References Cited

U.S. PATENT DOCUMENTS

| | | | | |
|---|---|---|---|---|
| 2007/0229801 | A1* | 10/2007 | Tearney | G02B 23/243 |
| | | | | 356/73 |
| 2009/0161115 | A1* | 6/2009 | Nishikawa | G01J 9/0215 |
| | | | | 356/521 |
| 2014/0253907 | A1* | 9/2014 | Ignatovich | G01M 11/025 |
| | | | | 356/73 |
| 2020/0191551 | A1* | 6/2020 | Stepień | G01M 11/338 |
| 2022/0301213 | A1* | 9/2022 | Chen | G06T 7/00 |
| 2023/0204345 | A1* | 6/2023 | Ishigaki | G06T 7/521 |
| | | | | 356/511 |
| 2024/0085269 | A1* | 3/2024 | Sugimoto | G01B 9/0209 |

FOREIGN PATENT DOCUMENTS

| | | | | |
|---|---|---|---|---|
| JP | 2005300250 | A | * 10/2005 | G03F 7/706 |
| JP | 2008107144 | A | 5/2008 | |
| JP | 2015010921 | A | 1/2015 | |

OTHER PUBLICATIONS

Pavan Kumar, Y. et al., "Interferometric Focal Length Measurement of Positive and Negative Lenses Using a Lateral-Shearing Cyclic Path Optical Configuration Setup and Polarization Phase-Shifting Interferometry," Applied Optics, vol. 56, No. 30, Oct. 20, 2017, pp. 8414-8419.

Pavan Kumar, Y. et al., "Technique for the Focal-Length Measurement of Positive Lenses Using Fizeau Interferometry," Applied Optics, vol. 48, No. 4, Feb. 1, 2009, pp. 730-736.

Sriram, K.V. et al., "Curvature and Focal Length Measurements Using Compensation of a Collimated Beam," Optics & Laser Technology, vol. 23, No. 4, May 16, 1991, pp. 241-245.

Wychowaniec, Marek et al., "Characterization of the Refractive Index in Gradient-Index Elements," Optica Applicata, vol. XXXVIII, No. 3, Jan. 2008, pp. 609-619, downloaded from https://www.researchgate.net/publication/26576648.

* cited by examiner

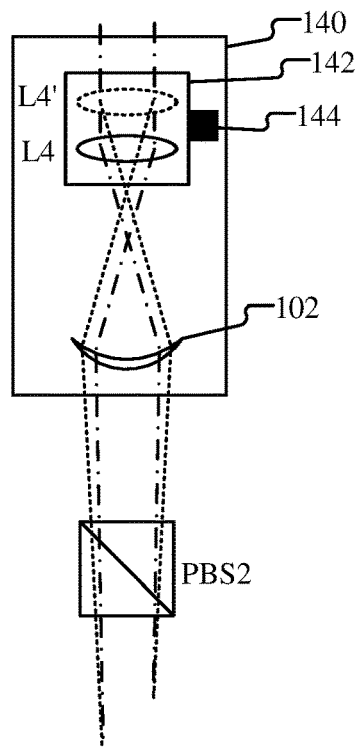
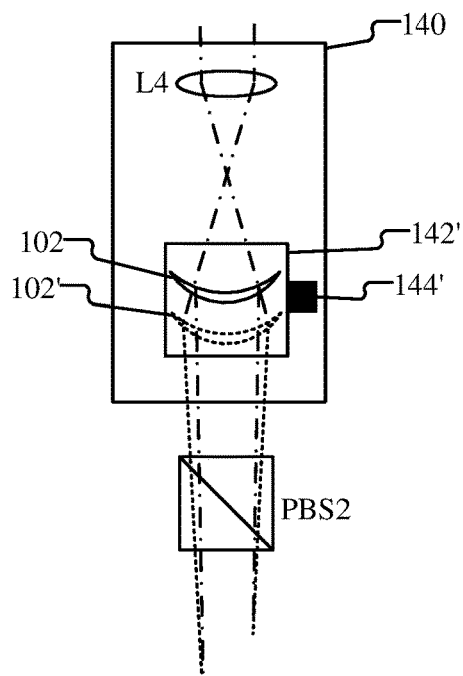
FIG. 2A
FIG. 2B
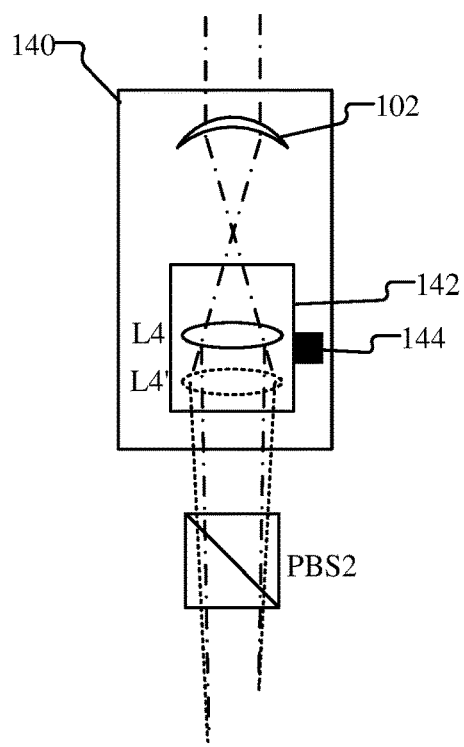
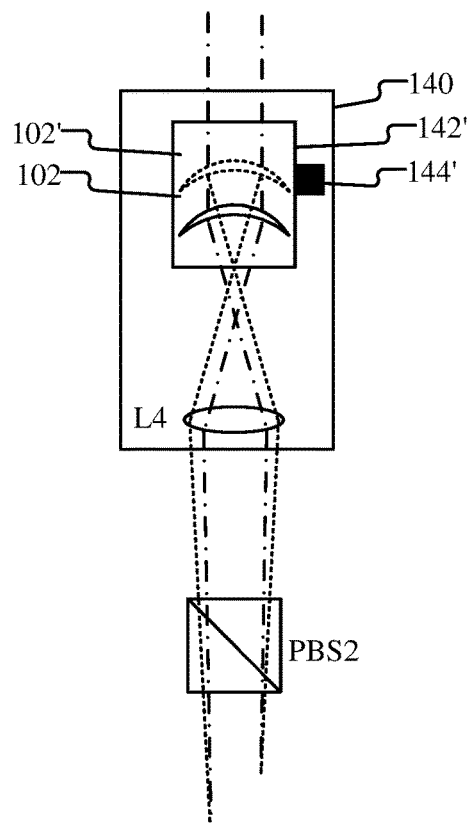
FIG. 2C
FIG. 2D

INTERFEROMETER WITH AUXILIARY LENS FOR MEASUREMENT OF A TRANSPARENT TEST OBJECT

FIELD OF THE DISCLOSURE

The present disclosure is related to interferometry, and in particular to Mach-Zehnder interferometry.

BACKGROUND

Optical metrology equipment may be used to provide non-contact evaluation of test objects. One type of test object that difficult to test is a transparent test object. An example of one type of transparent test object that requires testing is a lens. Other types of transparent test objects that may require testing include non-imaging optics such as anidolic optical components, conformal optical windows, conformal filters, conformal polarizers, conformal waveplates, diffractive optical elements, etc. By way of example, during design of some lenses, such as ophthalmic industry intraocular lenses (IOL), testing is required to demonstrate design intent. An optical metrology device that may be used to measure characteristics of a transparent test object, such as a lens, is an interferometer. Interferometers, for example, can practically measure the transmitted wavefront, but are limited in the ability to perform some measurements accurately.

SUMMARY

A Mach-Zehnder interferometer is configured for measuring a transparent test object. The Mach-Zehnder interferometer, for example, may be used to measure a lens, such as an interocular lens, or other types of transparent optical elements, such as non-imaging optics such as anidolic optical components, conformal optical windows, conformal filters, conformal polarizers, conformal waveplates, diffractive optical elements, etc. By way of example, the lens power of the test object, e.g., a lens, may be measured using the Mach-Zehnder interferometer. The interferometer splits an illumination beam into a reference beam directed to a reference arm and test beam directed to a test arm. One or more auxiliary lenses are located in the test arm so that the test beam is transmitted through the test object and one or more auxiliary lenses. The configuration and respective positions of the test object and one or more auxiliary lenses are configured to approximately collimate the test beam. The interferometer is configured so that the one or more auxiliary lenses and/or test object may be moved or otherwise positioned at different distances with respect to the other. The reference beam and test beam are combined after a single transmission of the test beam through the test object. The recombined beams generate an interference patterns. Multiple images of the interference patterns are captured for different relative distances between the test object and one or more auxiliary lenses. A lens power of a test lens, for example, may be determined using the interferometric power measurements from the images and the change in the relative distances used for the images.

In one implementation, a Mach-Zehnder interferometer is configured for measuring a test object that is transparent. The Mach-Zehnder interferometer includes a light source that produces an illumination beam and a first beam splitter that directs a first portion of the illumination beam along a reference arm and a second portion of the illumination beam along a test arm. The test arm is configured to hold the test object and comprises one or more auxiliary lenses and a stage that varies a relative distance between the test object and the one or more auxiliary lenses. A second beam splitter receives the first portion of the illumination beam from the reference arm and the second portion of the illumination beam from the test arm after a single transmission through the test object and the one or more auxiliary lenses and produces a combined beam. A camera is positioned to receive a first image of the combined beam produced with a first relative distance between the test object and the one or more auxiliary lenses and a second image of the combined beam produced with a second relative distance between the test object and the one or more auxiliary lenses.

In one implementation, a method of measuring a test object that is transparent uses a Mach-Zehnder interferometer. The method includes generating an illumination beam and splitting the illumination beam into a first portion along a reference arm and a second portion a test arm. The second portion of the illumination beam is transmitted through one or more auxiliary lenses and the test object in the test arm. Different relative distances between the test object and the one or more auxiliary lenses is produced. The first portion of the illumination beam from the reference arm and the second portion of the illumination beam from the test arm is combined after a single transmission through the test object and the one or more auxiliary lenses to produce a combined beam. The method includes capturing a first image of the combined beam produced with a first relative distance between the test object and the one or more auxiliary lenses and a second image of the combined beam produced with a second relative distance between the test object and the one or more auxiliary lenses.

In one implementation, a Mach-Zehnder interferometer configured for measuring a test object that is transparent includes a means for generating an illumination beam and a first beam splitter that directs a first portion of the illumination beam along a reference arm and a second portion of the illumination beam along a test arm. One or more auxiliary lenses are configured to be positioned at different relative distances with respect to the test object in the test arm, wherein the second portion of the illumination beam is transmitted through the one or more auxiliary lenses and the test object in the test arm. A second beam splitter receives the first portion of the illumination beam from the reference arm and the second portion of the illumination beam from the test arm after a single transmission through the test object and produces a combined beam. A camera is positioned to receive a first image of the combined beam produced with a first relative distance between the test object and the one or more auxiliary lenses and a second image of the combined beam produced with a second relative distance between the test object and the one or more auxiliary lenses.

BRIEF DESCRIPTION OF THE DRAWINGS

FIGS. 2A-2D schematically illustrate various implementations of producing different relative distances between one or more auxiliary lenses and the test object in the test arm.

DETAILED DESCRIPTION

Non-contact evaluation of test objects may be performed using an interferometer. Interferometry is a measurement that uses the interference of superimposed electromagnetic waves to extract information from a test object. For example, light from a light source is split into two beams that travel along different optical paths, including a reference path and a test path, which includes the test object. The light is recombined, which results in interference of the two light rays due to differences in the optical paths.

Measurement and evaluation of test objects is useful, for example, to demonstrate design intent and performance of the test objects. For example, test objects that may be desirable to measure and evaluate may include transparent test objects, such as lenses and other optics, such as non-imaging optics, anidolic optical components, conformal optical windows, conformal filters, conformal polarizers, conformal waveplates, diffractive optical elements, etc. The measurement and evaulation of the test objects may be used to demonstrate design intent and performance.

One particular type of transparent test object that requires measurement and evaluation are lenses, such as ophthalmic lenses including interocular lenses. Lenses, and other transparent test objects, may be evaluated using interferometry to measure the transmitted wavefront of the test object. Accurate measurement of transparent test objects, however, may sometimes be difficult. For example, with a high power lens, such as an interocular lens, which may have a lens power of up to 35 diopters, the fringes produced during the measurement of the transmitted wavefront may be too close for accurate measurement.

As discussed herein, a Mach-Zehnder interferometer may be used to accurately evaluate transparent test objects. In some implementations, the transparent test objects may lenses, such as interocular lens or other high power lenses. The Mach-Zehnder interferometer includes one or more auxiliary lenses that is located in the test path along with the test object. The one or more auxiliary lens, for example, may be positioned at a plurality of positions with respect to the test object and is used with the test object to collimate the test beam before combining with the reference beam. The interference patterns are imaged and the interferometric power measured. In some implementations, e.g., when the test object is a test lens, the lens power of the test lens may be extracted based on the measured interferometric powers and the difference in the relative distance between the test lens and the auxiliary lens.

Figure 1A:
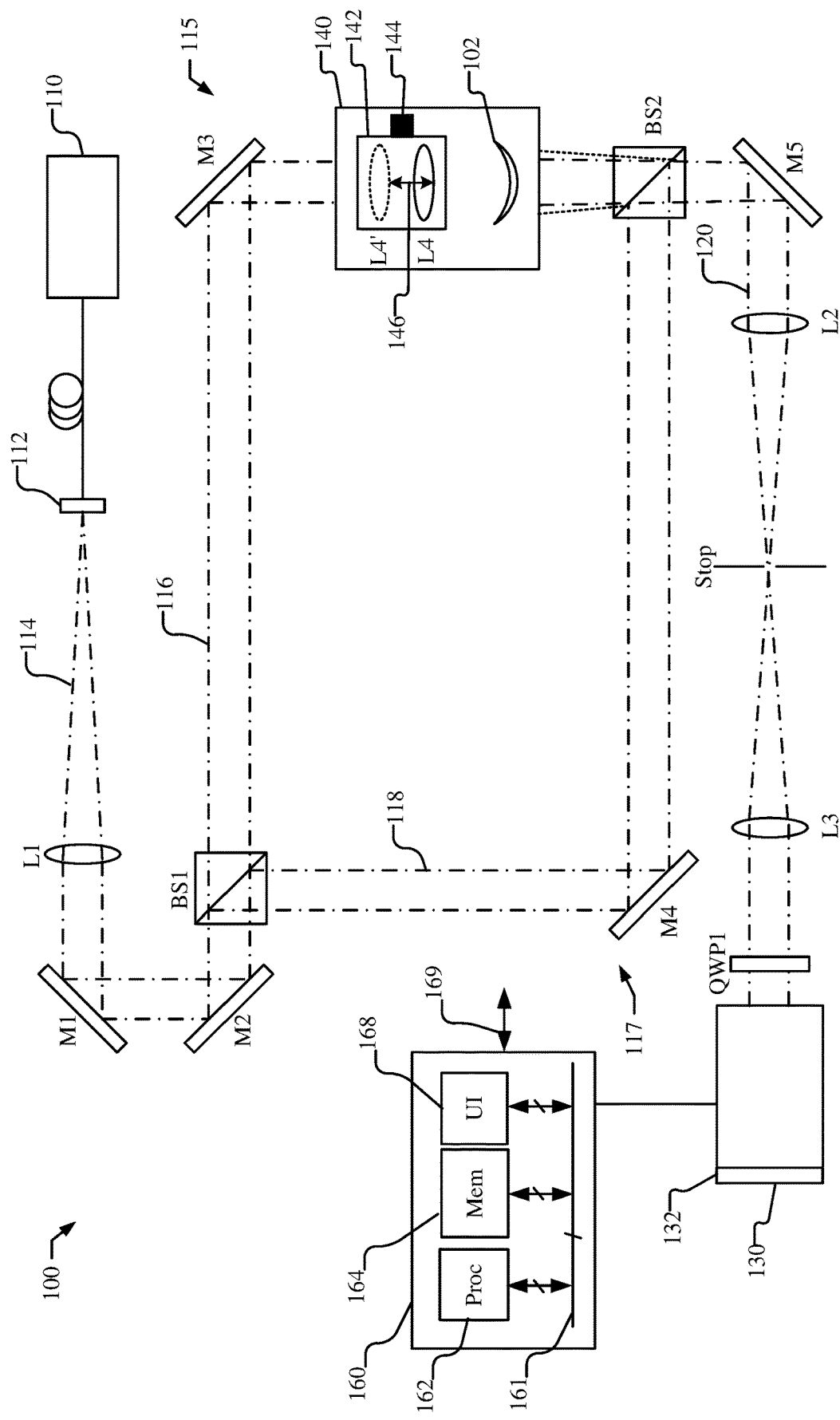
FIGS. 1A-1D illustrates schematic views of variations of an interferometer configured for measuring a test object.

FIG. 1A illustrates a schematic view of an interferometer 100 that is configured for measuring a test object 102. The test object 102 may be a lens, such as an interocular lens, and accordingly, is sometimes referred to herein as test lens 102. It should be understood, however, that the test object may not be limited to a lens, unless otherwise stated, and may be other types of transparent optical elements, including non-imaging optics, anidolic optical components, conformal optical windows, conformal filters, conformal polarizers, conformal waveplates, diffractive optical elements, etc. The interferometer 100 is double-path interferometer, in which the reference beam and the test beam travel along different optical paths. Moreover, the interferometer 100 uses a single pass test beam, in which the test beam is transmitted through the test object only a single time, after which the test beam is recombined with the reference beam to produce an interference beam. The interferometer 100 illustrated in FIG. 1A is a Mach-Zehnder interferometer.

The interferometer 100 includes a light source 110 that produces an illumination beam 114 by placing a fiber launch 112 of the light source 110 at the back focal position of a first lens L1, which collimates the illumination beam 114. The light source 110, for example, may be a narrow band light source that produces a desired wavelength of light, e.g., approximately 633 nm. The light source 110, for example, may be an LED, laser or incandescent source, such as a tungsten lamp, or a plasma source or arc lamp, or any other suitable high brightness light source. One or more appropriate filters may be used in conjunction with a light source 110 to generate a desired bandwidth.

The collimated illumination beam 114 is received by a beam splitter BS1, which may be a polarizing beam splitter. In some implementations, one or more mirrors, illustrated as mirrors M1 and M2 may be present to direct the collimated illumination beam 114 to the beam splitter BS1. The beam splitter BS1 splits the illumination beam 114 into a test beam 116 and a reference beam 118, which are respectively directed to a test arm 115 and a reference arm 117. The test beam 116 is directed towards a second beam splitter BS2, which may be a polarizing beam splitter, e.g., via mirror M3, and passes a single time through test lens 102, while the reference beam 118 is directed towards the second beam splitter BS2, e.g., via mirror M4. The second beam splitter BS2 combines the test beam 116 and the reference beam 118 producing an interference beam 120. The interference beam 120 includes an interference pattern that represents the difference in the wavefronts of the test beam 116 and the reference beam 118. The interference pattern of the interference beam 120 is received by a camera 130, e.g., via mirror M5 and an afocal imaging relay illustrated as including lenses L2 and L3, and stop, to image the test lens plane onto the camera 130.

As illustrated by box 140, within the test arm 115 the test lens 102 is held along with one or more auxiliary lenses L4. The one or more auxiliary lenses L4 may be placed in the optical path before or after the test lens 102. In some implementations, the one or more auxiliary lenses L4 may be a single auxiliary lens L4, which may be moved between different positions (illustrated by lens L4 with solid lines and lens L4' with dotted lines) by a stage 142 and actuator 144. It should be understood that either the auxiliary lens L4, the test lens 102, or both may be coupled to the stage 142 with actuator 144 and move to different positions (illustrated by arrow 146) to generate different relative distances between the auxiliary lens L4 and the test lens 102. In some implementations, the one or more auxiliary lenses L4 may be two auxiliary lenses (illustrated by lens L4 with solid lines and lens L4' with dotted lines) that are the same and are configured to move in and out of the optical path of the test arm 115 in different positions (illustrated by arrow 146) to generate different relative distances with respect to the test lens 102 (e.g. by moving the auxiliary lenses into or out of the optical path, or by altering the optical path (e.g., using flip mirrors or the like) to pass through a different auxiliary lens).

The one or more auxiliary lenses L4 may include one or more optical elements, i.e., the auxiliary lens L4 may be a compound lens. In some implementation, the one or more auxiliary lenses L4 may be one or more Gradient-Index (GRIN) lenses, holographic lens, etc. In one implementation, the one or more auxiliary lenses L4 may function as an affective point source for the test lens 102, and may be placed at a first distance from the test lens 102 that is at a designed conjugate plane of the test lens 102 so that the light transmitted through both the one or more auxiliary lenses L4 and the test lens 102 is collimated. Collimation of the light, for example, may be determined by minimizing the measured power, e.g., the light is substantially collimated when the measured power is minimized. In another implementation, the test lens 102 may function as an affective point source for the one or more auxiliary lenses L4, and may be placed at a first distance from the one or more auxiliary lenses L4 that is at a designed back focal plane of the test lens 102 so that the light transmitted through both the one or more auxiliary lenses L4 and the test lens 102 is collimated. The one or more auxiliary lenses L4 (or test lens 102) may be moved to a second distance, which produces a spherical wavefront. The second distance, for example, may be a distance that produces a detectable change in power. The power from the spherical wavefront may be twenty waves for example.

FIGS. 2A-2D illustrate various implementations of box 140 shown in FIGS. 1A-1D and specifically variations for generating different relative distances between the one or more auxiliary lenses L4 and the test lens 102. In some implementations, the one or more auxiliary lenses L4 may be one or more negative lenses. FIGS. 2A and 2B, for example, illustrates an implementation where the one or more auxiliary lenses L4 is positioned in the test arm before the test lens 102. The one or more auxiliary lenses L4, for example, may receive the test beam and produce an affective point source for the test lens 102. The test lens 102 re-collimates the test beam received from one or more the auxiliary lenses L4. As illustrated in one implementation shown in FIG. 2A, the test lens 102 may be stationary and the one or more auxiliary lenses L4 may be coupled to stage 142, which moves the one or more auxiliary lenses L4 to different positions (illustrated by the solid lens L4 and the dotted lens L4') with actuator 144 to generate different relative distances between the one or more auxiliary lenses L4 and the test lens 102. In some implementations, separate auxiliary lenses L4, which are optically the same, may be moved into and out of the test beam path at different positions (illustrated by the solid lens L4 and the dotted lens L4'). As illustrated in one implementation shown in FIG. 2B, the one or more auxiliary lenses L4 may be stationary and the test lens 102 may be coupled to stage 142', which moves test lens 102 with actuator 144' to different positions (illustrated by the solid lens 102 and the dotted lens 102') to generate different relative distances between the one or more auxiliary lenses L4 and the test lens 102.

FIGS. 2C and 2D, for example, illustrates an implementation where the one or more auxiliary lenses L4 is positioned in the test arm after the test lens 102. The test lens 102, for example, may receive the test beam and produce an affective point source for the one or more auxiliary lenses L4. The one or more auxiliary lenses L4 re-collimates the test beam received from test lens. As illustrated in one implementation shown in FIG. 2C, the test lens 102 may be stationary and the one or more auxiliary lenses L4 may be coupled to stage 142, which moves the one or more auxiliary lenses L4 with actuator 144 to different positions (illustrated by the solid lens L4 and the dotted lens L4') to generate different relative distances between the one or more auxiliary lenses L4 and the test lens 102. In some implementations, separate auxiliary lenses L4, which are optically the same, may be moved into and out of the test beam path at different positions (illustrated by the solid lens L4 and the dotted lens L4'). As illustrated in one implementation shown in FIG. 2D, the one or more auxiliary lenses L4 may be stationary and the test lens 102 may be coupled to stage 142', which moves test lens 102 with actuator 144' to different positions (illustrated by the solid lens 102 and the dotted lens 102') to generate different relative distances between the one or more auxiliary lenses L4 and the test lens 102.

By way of example, in the case of an interocular lens, which is designed to focus a collimated beam onto the retina, the one or more auxiliary lenses L4 may be placed such that the front focus of the one or more auxiliary lenses L4 overlaps with the back focal position of the test lens 102 to produce a collimated beam propagating toward beam splitter BS2. The stage 142 may then be moved along the optical axis of the test arm to shift the one or more auxiliary lenses L4 (as illustrated in FIGS. 2A and 2C) or to shift the test lens (as illustrated in FIGS. 2B and 2D) to a new position, or the one or more auxiliary lenses L4 may be moved into and out of the optical path at different positions. The new position results in a change in the power in the wavefront leaving the test lens. By measuring the power and the difference in the stage (or auxiliary lens) position for each of the two measurements, the lens power of the test lens can be determined.

Referring to FIG. 1A, in some implementations, the wavefront difference between the test and reference beams can be quantified using a pixelated phase mask. For example, the first and second beam splitters BS1 and BS2 may be polarizing beam splitters, a quarter waveplate QWP1 may be positioned between the lens L3 and the camera 130. The quarter waveplate QWP1 is oriented to produce circularly polarized beams at the camera 130. A phase mask 132 may be included in the camera 130, e.g., in the form of a pixel-level micropolarizer array before a detector array, such as a CCD array, which are located in substantially the same image planes to receive the image of the interference beam 120 from the afocal imaging relay. The interference beam 120 passes through the micropolarizer array creating a number (N) of interleaved samples of the interference pattern on the detector array, with, e.g., the same magnitude of phase difference between each sample. Thus, the camera 130 may receive an image of the interference beam 120 creating an interferogram at each pixel in the camera 130. The different phase shift elements in the micropolarizer array in the phase mask produce an interleaved image of a number (N) of samples, each with the same phase shift, i.e. there are N different samples of the interferogram as function of phase. Groups of nearby samples (pixels) with different phase shifts may be processed together. The processing may be performed using a number of pixels other than N. The micropolarizer array, by way of example, includes an array of linear polarizers arranged in groups of four, with polarizer orientation 0°, 45°, 90° and 135°, that introduce a phase shift between the test beam and reference beam of twice the polarizer angle (reference). The micropolarizer array and detector array may be, e.g., a Phasecam manufactured by 4D Technologies using a wire grid polarizer array manufactured by Moxtek. Using the pixelated phase-mask, the wavefront difference between the test and reference beams can be quantified through phase shifted fringes.

In some implementations, other types of phase shifting may be performed to quantify the wavefront difference between the test beam and reference beam, such as temporal phase shifting, e.g., using a rotating polarizer in the optical path, or spatial carrier phase shifting without polarization. For example, with temporal phase shifting, a series of three or more camera frames are captured while synchronously shifting the phase between the test beam and reference beam to produce an equal phase-shift between each captured frame. The phase-shift, for example, may be 90° between captured frames. The phase shift can be imparted in several ways.

Figure 1B:
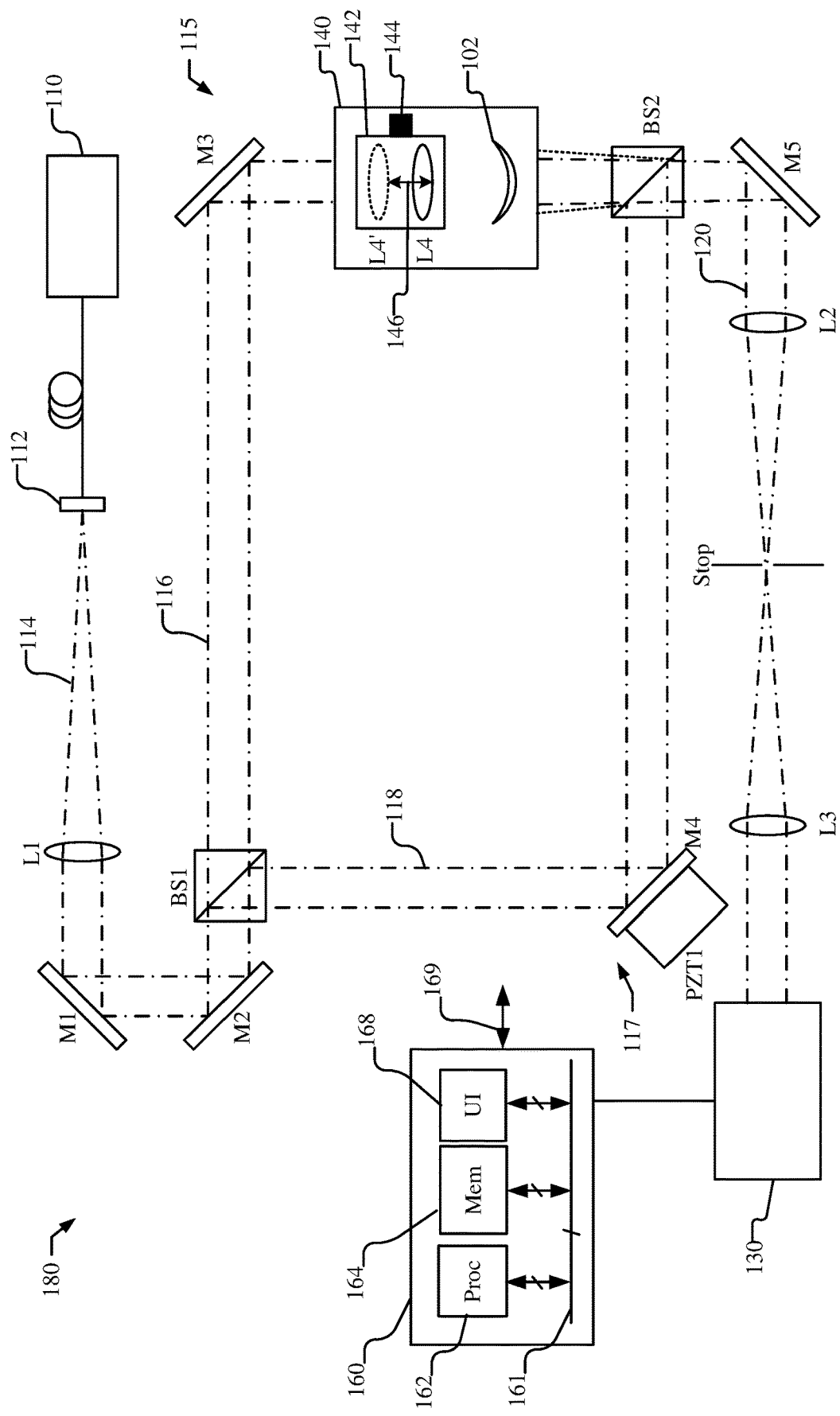

FIG. 1B illustrates a schematic view of an interferometer 180 that is similar to interferometer 100 shown in FIG. 1A (like designated elements being the same) but that uses temporal phase shifting for measuring a test lens 102. As illustrated in FIG. 1B, in one implementation, the phase shift may be imparted using a piezoelectric transducer (PZT) on a mirror, such as mirror M4. The mirror may be moved in a direction normal to the reflecting surface such that there are even phase-shifts between captured frames.

Figure 1C:
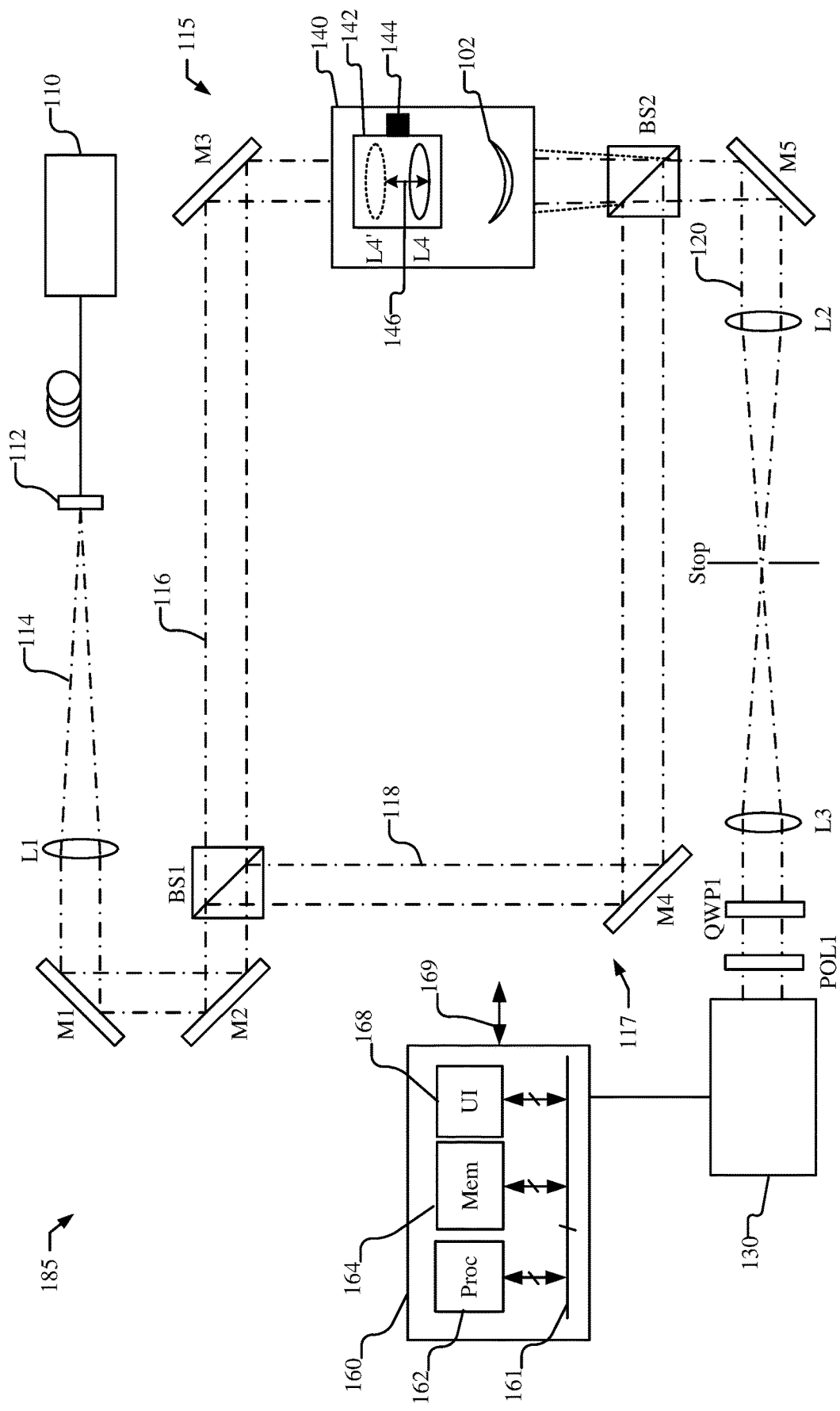

FIG. 1C illustrates a schematic view of an interferometer 185 that is similar to interferometer 100 shown in FIGS. 1A and 1B (like designated elements being the same) but that uses temporal phase shifting for measuring a test lens 102. As illustrated in FIG. 1C, in one implementation, the phase shift may be imparted using polarizing beam splitters for the first and second beam splitters BS1 and BS2, and placing a rotating polarizer POL1 in front of the camera 130, and a quarter waveplate QWP1 before the rotating polarizer POL1 that produces circularly polarized light. A series of frames are captured synchronously with the rotation of the polarizer such that there are equally spaced phase-shifts between frames.

In another implementation, spatial carrier phase-shifting without polarization may be used to quantify the wavefront difference between the test beam and reference beam. A known tilt may be introduced between the test beam and references beam such that there is a 90° phase shift imparted on the diagonal. Phase is calculated similar to the approach to the pixelated phase mask, discussed above. The required tilt is small enough that it would not show up substantially in the layout. Tilt for example, may be introduced by tilting a mirror, e.g., mirror M4.

Figure 1D:
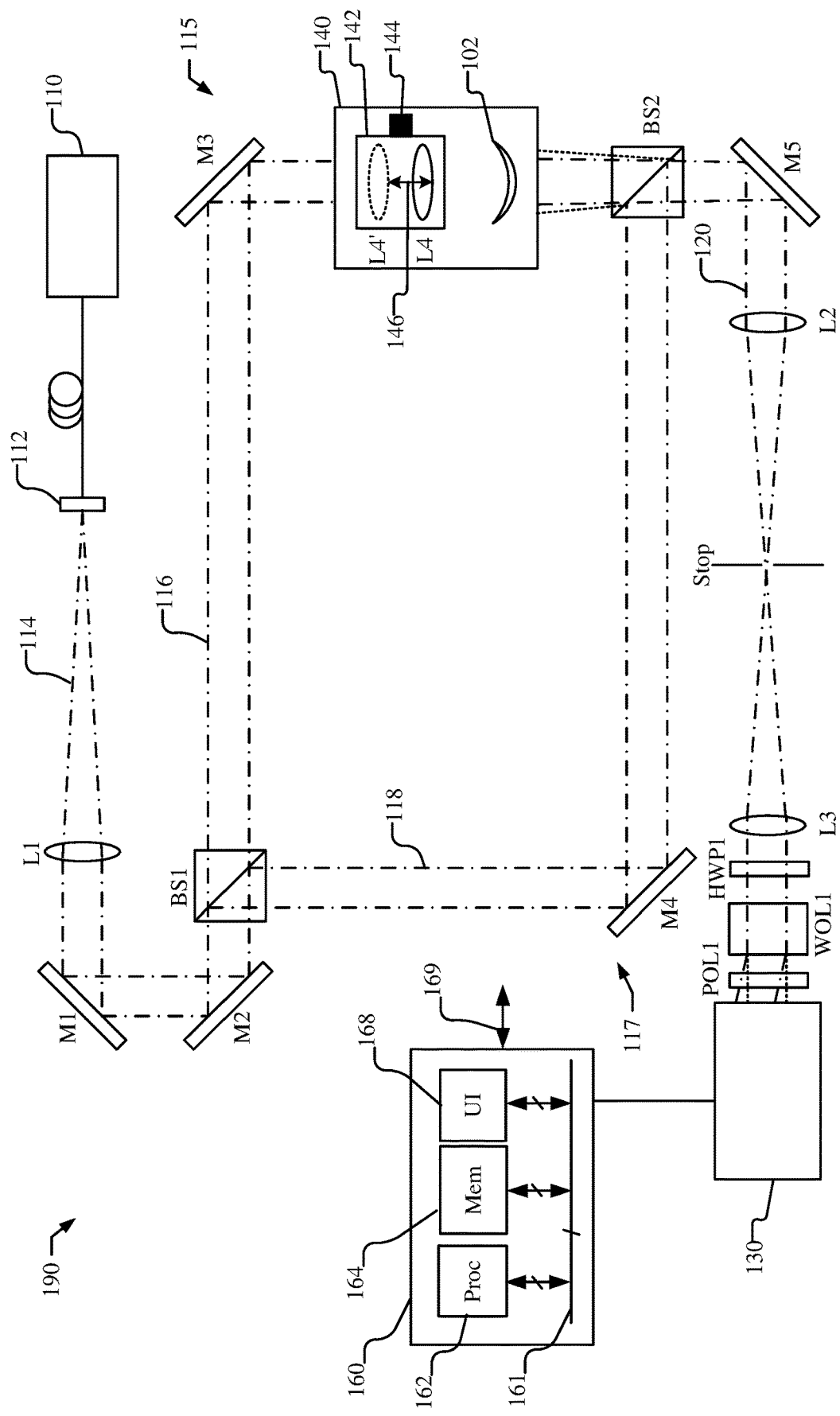

FIG. 1D illustrates a schematic view of an interferometer 190 that is similar to interferometer 100 shown in FIGS. 1A-1C (like designated elements being the same) but that uses spatial phase shifting for measuring a test lens 102. As illustrated in FIG. 1C, in one implementation, the phase shift may be imparted using a Wollaston prism WOL1, where polarizing beam splitters are used for beam splitters BS1 and BS2, and a half waveplate HWP1 is positioned before the Wollaston prism WOL1, and a polarizer POL1 is positioned after the Wollaston prism WOL1. The Wollaston prism WOL1 tilts one beam relative to the other beam based on the orthogonal linear polarization, the half waveplate HWP1 orients the linear polarization components of the test beam and reference beam with the crystal axis of the Wollaston prism WOL1, and the polarizer POL1 combines the polarization so that the beams will interfere.

The camera 130 is configured to receive a first image of the interference beam 120 that is produced with a first relative distance between the test lens 102 and the one or more auxiliary lenses L4 and a second image of the interference beam 120 that is produced with a second relative distance between the test lens 102 and the one or more auxiliary lenses L4. The first image, for example, may be produced with the first relative distance between the test lens 102 and the one or more auxiliary lenses L4 configured to produce a collimated output beam, while the second image may be produced with the different relative distance between the test lens 102 and the one or more auxiliary lenses L4. Each image captured by the camera 130 may be a single frame or multiple frames.

The camera 130, e.g., the detector array, is coupled to a computer system 160, such as a workstation, a personal computer, central processing unit or other adequate computer system, or multiple systems. The computer system 160 is preferably included in, or is connected to or otherwise associated with interferometer 100. The computer system 160 may also control the movement of the stage 142 (or other elements to move the one or more auxiliary lenses L4 into and out of the test beam path). The computer system 160 may collects and analyze the interferometric data obtained from the camera 130 as discussed herein. For example, the computer system 160 may analyze the interferometric data to determine one or more physical characteristics of the test lens 102, such as the lens power, as well as any aberrations using measured wavefronts, as discussed below. The computer system 160 may include at least one processor 162 with memory 164, as well as a user interface (UI) 168, which may include a display, input device, output device, etc., coupled by bus 161. A non-transitory computer-usable storage medium having computer-readable program code embodied stored in memory 164 or other storage element may be used by the computer system 160 for causing the at least one processor 162 to control the interferometer 100 and to perform the functions including the analysis described herein. The data structures and software code for automatically implementing one or more acts described in this detailed description can be implemented by one of ordinary skill in the art in light of the present disclosure and stored, e.g., on a non-transitory computer-usable storage medium, which may be any device or medium that can store code and/or data for use by a computer system such as the at least one processor 162. The computer-usable storage medium may be, but is not limited to, magnetic and optical storage devices such as disk drives, magnetic tape, compact discs, and DVDs (digital versatile discs or digital video discs). A communication port 169 may also be used to receive instructions that are used to program the computer system 160 to perform any one or more of the functions described herein and may represent any type of communication connection, such as to the internet or any other computer network. The communication port 169 may further export signals, e.g., with measurement results and/or instructions, to another system, including external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

Figure 3:
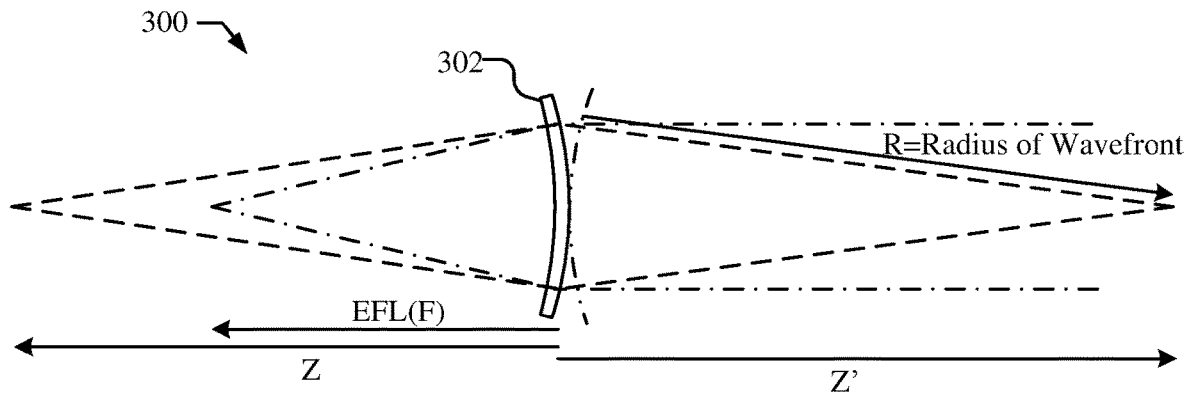
FIG. 3 illustrates a thin lens geometry.

FIG. 3, by way of example, shows a thin lens geometry 300 illustrated to assist in the derivation of governing equations for the analysis of measured interferometry images captured by the camera 130 to evaluate the test lens 102. FIG. 3 illustrates a thin lens 302, an object distance Z, image distance Z', and effective focal length EFL(F), and the radius of the wavefront R.

Using the thin lens equation with the geometry 300, shown in FIG. 3, the image distance Z' can be determined for a point on-axis as a function of the object distance Z, as equation 1. The geometry 300 assumes distances with a vector pointing from right to left is a negative number, therefore, Z is a negative number.

$$\frac{1}{Z'} - \frac{1}{Z} = \frac{1}{F} \qquad \text{eq. 1}$$

Rearranging equation 1 to isolate Z, produces equation 2.

$$Z = \frac{Z'F1}{F - Z'} \qquad \text{eq. 2}$$

By capturing two images with different Z positions ($Z_1$ and $Z_2$), i.e., different relative distances between the test lens 102 and the one or more auxiliary lenses L4, the difference in the two Z positions is related to the two resulting Z' positions ($Z'_1$, and $Z'_2$) and F as follows.

$$\Delta Z = \frac{Z'_2 F}{(F - Z'_2)} - \frac{Z'_1 F}{(F - Z'_1)} \qquad \text{eq. 3}$$

Creating a common denominator, equation 3 can be simplified to become equation 4.

$$\Delta Z = \frac{Z'_2 F(F - Z'_1) - Z'_1 F(F - Z'_2)}{(F - Z'_2)(F - Z'_1)} = \frac{F^2(Z'_2 - Z'_1)}{(F - Z'_2)(F - Z'_1)} \qquad \text{eq. 4}$$

Inspecting the denominator of equation 4, it may be assumed that $F << Z'_1$ or $Z'_2$ to isolate F to only the numerator in equation 4. This is a valid assumption since first measured image is generated with the first relative distance between the test lens 102 and the one or more auxiliary lenses L4 configured to produce a collimated output beam, i.e., $Z'_1=0$, and the second relative distance between the test lens 102 and the one or more auxiliary lenses L4 is large to produce a measurable wavefront at the camera 130.

$$\Delta Z = \frac{F^2(Z'_2 - Z'_1)}{Z'_2 Z'_1} \qquad \text{eq. 5}$$

It should be noted that one of the features of the relationship illustrated above is that it is not necessary to know the exact position of the one or more auxiliary lenses LA relative to the test lens 102, but that only the distance between the position of the one or more auxiliary lenses LA between measurements (e.g., as illustrated by arrow 146 shown in FIGS. 1A-1D) is relevant.

The position Z' is the radius R of curvature of the wavefront leaving the lens 302. The interferometric measurement of the lens power to the image distance Z' may be related using the sagitta (sag) equation, where the sag $S(\rho)$ is the displacement along the optic axis of the surface from the vertex, at distance p from the axis.

$$S(\rho) \approx \frac{\rho^2}{2R} \qquad \text{eq. 6}$$

Figure 4:
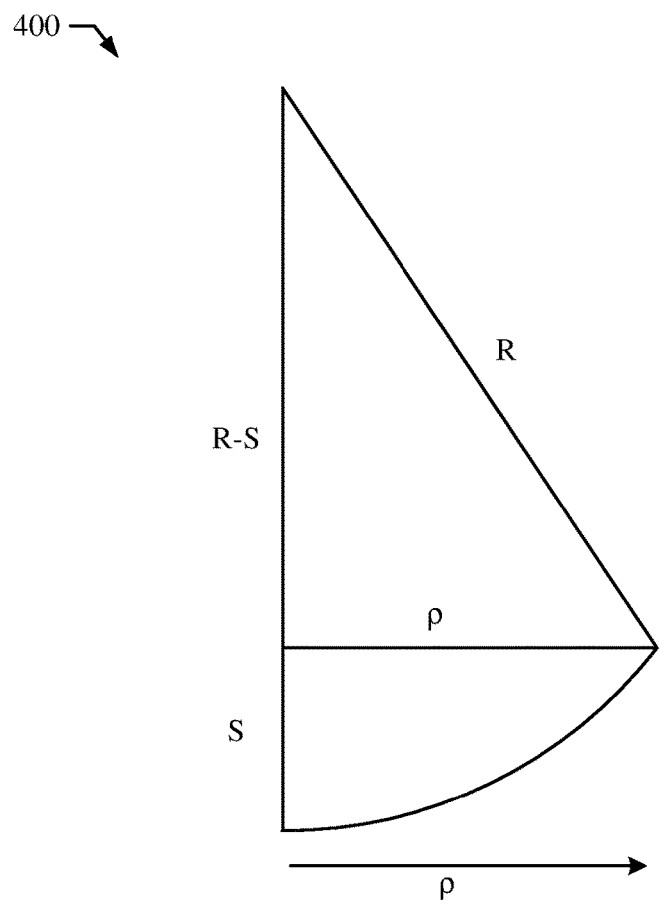
FIG. 4 illustrates the sag equation geometry.

FIG. 4, by way of example, illustrates the geometry 400 for the sag equation. Examining the right triangle shown in FIG. 4, the hypotenuse R can be isolated as a function of $\rho$ and S as shown in equation 7.

$$R^2 = \rho^2 + (R - S)^2 = \rho^2 + R^2 - 2RS + S^2 \qquad \text{eq. 7}$$

$$2RS = \rho^2 + S^2 \qquad \text{eq. 8}$$

$$R = \frac{(\rho^2 + S^2)}{2S} \qquad \text{eq. 9}$$

The wavefront sag $S(\rho)$ is related to the measured Seidel power by the following relationship where $\varphi$ is the measured Seidel power in waves, i.e., the interferometric power measurement, and $\lambda$ is the wavelength of the illumination beam 114 in the interferometer 100.

$$S = \varphi \lambda \qquad \text{eq. 10}$$

Based on substitution of equation 10 into equation 9 (and noting that the object position Z' is the radius of the wavefront), the object position Z' can be obtained from the interferometric power measurement as follows.

$$Z' = \frac{(\rho^2 + \varphi^2 \lambda^2)}{2\varphi^2 \lambda^2} \qquad \text{eq. 11}$$

The thin lens assessment from equation 5 may be combined with the sag assessment from equation 11 to derive the base equation for extracting the effective focal length F of the test lens 102 (or equivalently the lens power of the test lens 102 (i.e., power=1/F), assuming that the same radius $\rho$ and wavelength $\lambda$ is used for the measurement of both the first image and the second image.

$$F = \sqrt{\frac{\Delta Z \frac{(\rho^2 + \varphi_2^2 \lambda^2)}{2\varphi_2 \lambda} \frac{(\rho^2 + \varphi_1^2 \lambda^2)}{2\varphi_1 \lambda}}{\frac{(\rho^2 + \varphi_2^2 \lambda^2)}{2\varphi_2 \lambda} - \frac{(\rho^2 + \varphi_1^2 \lambda^2)}{2\varphi_1 \lambda}}} \qquad \text{eq. 12}$$

Thus, by measuring the interferometric power $\varphi$ and the difference $\Delta Z$ in relative distance between the test lens 102 and the one or more auxiliary lenses L4 between the two images, the lens power of the test lens 102 may be determined. Additionally, using one of the images of the interferometric beam, aberrations may be detected in the wavefront.

Additionally, some test lenses, such as an IOL lens may have multiple lens powers, e.g., along different axes or in different zones. For example, an IOL lens may be a toric lens with an asigmatic power, where there are two different powers (focal along orthogonal axes). The lens power for the test lens may be measured for each axis. By way of example, the measured power for each axis may be measured at different relative distances between the test lens and the one or more auxiliary lenses, and the lens power for each axis may be determined, e.g., using equation 12. In another example, the test lens may have zonal power, e.g., where there are rings at different radii of the test lens that have with different power. The lens power for the test lens may be measured for each zone in the test lens. By way of example, the measured power for each zone may be measured at different relative distances between the test lens and the one or more auxiliary lenses, and the lens power for each axis may be determined, e.g., using equation 12.

Figure 5:
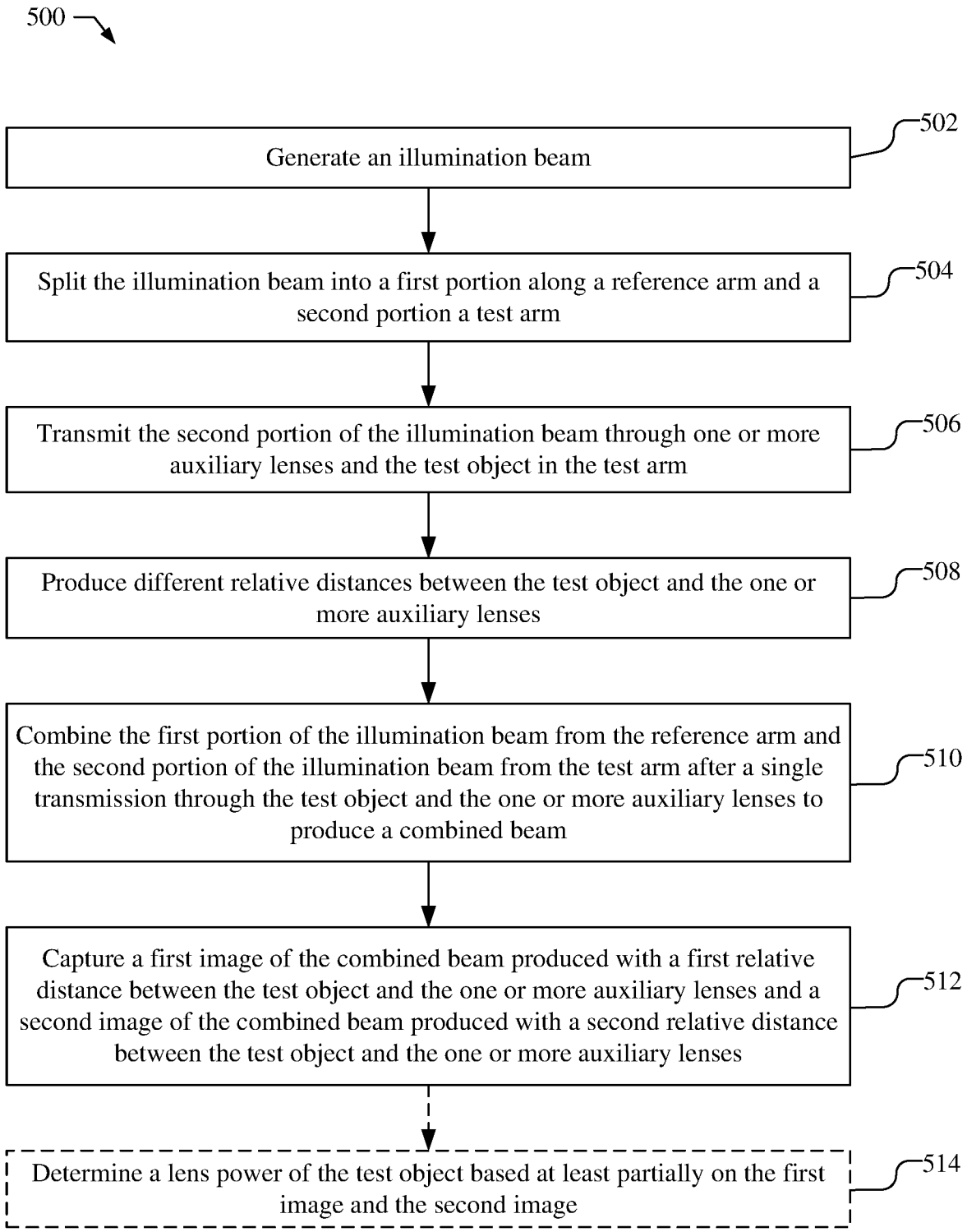
FIG. 5 shows a flowchart for a method for measuring a test object using an interferometer.

FIG. 5 shows a flowchart 500 for a method for measuring a test object that is transparent using an interferometer, such as a Mach-Zehnder interferometer, e.g., such as interferometer 100 illustrated in FIGS. 1A-1D and FIGS. 2A-2D. In some implementations, the test object may be an intraocular lens, which may be a high power lens, e.g., up to 35 diopters. In some implementations, the test object may be any of an anidolic optical component, a conformal optical window, a conformal filter, a conformal polarizer, a conformal waveplate, or a diffractive optical element.

At block 502, an illumination beam is generated, e.g., such as illumination beam 114 discussed in reference to FIGS. 1A-1D. For example, a means for generating an illumination beam may be the light source 110 of the interferometer 100, shown in FIGS. 1A-1D.

At block 504, the illumination beam is split into a first portion along a reference arm and a second portion a test arm, such as reference beam 118 along reference arm 117 and test beam 116 along test arm 115, shown in FIGS. 1A-1D. For example, a means for splitting the illumination beam into a first portion along a reference arm and a second portion a test arm may include the first beam splitter BS1, shown in FIGS. 1A-1D.

At block 506, the second portion of the illumination beam is transmitted through one or more auxiliary lenses and the test object in the test arm, such as through one or more auxiliary lenses L4 and test object 102 in the test arm 115, as illustrated in FIGS. 1A-1D and FIGS. 2A, 2B, 2C, and 2D. For example, the one or more auxiliary lenses may be an affective point source for the test object or the test object may be an affective point source for the one or more auxiliary lenses, as discussed in FIGS. 1A-1D.

At block 508, different relative distances are produced between the test object and the one or more auxiliary lenses, e.g., as illustrated in FIGS. 1A-1D and FIGS. 2A, 2B, 2C, and 2D. For example, a means for producing different relative distances between the one or more auxiliary lenses and the test object may be a stage 142 with actuator 144 or using auxiliary lenses that are placed in and out of the optical axis of the test arm, as discussed in FIGS. 1A-1D and FIGS. 2A, 2B, 2C, and 2D.

At block 510, the first portion of the illumination beam from the reference arm and the second portion of the illumination beam from the test arm are combined after a single transmission through the test object and the one or more auxiliary lenses to produce a combined beam, such as interference beam 120 produced by combining the reference beam 118 and the test beam 116 after a single transmission through the test object 102 and the one or more auxiliary lenses L4. A means for combining the first portion of the illumination beam from the reference arm and the second portion of the illumination beam from the test arm after a single transmission through the test object and the one or more auxiliary lenses to produce a combined beam, for example, may be the second beam splitter BS2 shown in FIGS. 1A-1D.

At block 512, a first image of the combined beam produced with a first relative distance between the test object and the one or more auxiliary lenses is captured and a second image of the combined beam produced with a second relative distance between the test object and the one or more auxiliary lenses is captured, e.g., as discussed in reference to FIGS. 1A-1D and FIGS. 2A, 2B, 2C, and 2D. A means for capturing a first image of the combined beam produced with a first relative distance between the test object and the one or more auxiliary lenses and a second image of the combined beam produced with a second relative distance between the test object and the one or more auxiliary lenses, for example, may be the camera 130 shown in FIGS. 1A-1D.

In some implementations, as illustrated with block 514 with dotted lines, a lens power of the test object is determined based at least partially on the first image and the second image, e.g., as discussed in reference to FIGS. 1A-1D and equation 12. For example, the lens power of the test object may be determined using interferometric power measurements from the first image and the second image and further using a change in relative distance between the first relative distance and the second relative distance. A means for determining a lens power of the test object based at least partially on the first image and the second image may include, e.g., the computer system 160 with at least one processor 162 with dedicated hardware or implementing executable code or software instructions in memory 164 in interferometer 100, shown in FIGS. 1A-1D. In some implementations, a transmitted wavefront from at least one of the first image and the second image may be measured as discussed in FIGS. 1A-1D. Additionally, the test object, which may be an IOL lens that are often toric lenses, may have an asigmatic power, where there are two different powers (focal along orthogonal axes). In some implementations, the lens power for the test object may be measured along each axis, e.g., by assessing the measured power for each axis at different relative distances between the test object and the one or more auxiliary lenses. Additionally, the test object may have zonal power, e.g., where there are rings with different power at different radii of the test object. In some implementations, the lens power for the test object may be measured for each zone, e.g., by assessing the measured power for each zone at different relative distances between the test object and the one or more auxiliary lenses.

In one implementation, the one or more auxiliary lenses is positioned in the test arm before the test object or the one or more auxiliary lenses is positioned in the test arm after the test object, e.g., as illustrated in FIGS. 2A and 2B or FIGS. 2C and 2D, respectively. For example, in some implementations, the test object re-collimates the second portion of the illumination beam received from the one or more auxiliary lenses if the one or more auxiliary lenses is positioned before the test object (as illustrated in reference to FIGS. 2A and 2B) or the one or more auxiliary lenses re-collimates the second portion of the illumination beam received from the test object if the one or more auxiliary lenses is positioned after the test object (as illustrated in reference to FIGS. 2C and 2D). In some implementations, the one or more auxiliary lenses receives the second portion of the illumination beam and produces an affective point source for the test object if the one or more auxiliary lenses is positioned before the test object (as illustrated in reference to FIGS. 2A and 2B) or the test object receives the second portion of the illumination beam and produces an affective point source for the one or more auxiliary lenses if the one or more auxiliary lenses is positioned after the test object (as illustrated in reference to FIGS. 2A and 2B). For example, the first relative distance between the test object and the one or more auxiliary lenses places the affective point source at a designed conjugate plane of the test object, as discussed in FIGS. 1A-1D and FIGS. 2A, 2B, 2C, and 2D.

Although the present invention is illustrated in connection with specific implementations for instructional purposes, the present invention is not limited thereto. Various adaptations and modifications may be made without departing from the scope of the invention. Therefore, the spirit and scope of the appended claims should not be limited to the foregoing description.

What is claimed is:

1. A Mach-Zehnder interferometer configured for measuring a test object that is transparent, comprising:
    a light source that produces an illumination beam;
    a first beam splitter that directs a first portion of the illumination beam along a reference arm and a second portion of the illumination beam along a test arm;
    the test arm is configured to hold the test object and comprises one or more auxiliary lenses and a stage that varies a relative distance between the test object and the one or more auxiliary lenses;

a second beam splitter that receives the first portion of the illumination beam from the reference arm and the second portion of the illumination beam from the test arm after a single transmission through the test object and the one or more auxiliary lenses and produces a combined beam;

a camera positioned to capture a first image of the combined beam representing a first transmitted wavefront from the test object produced with a first relative distance between the test object and the one or more auxiliary lenses and to capture a second image of the combined beam representing a second transmitted wavefront from the test object produced with a second relative distance between the test object and the one or more auxiliary lenses; and at least one processor coupled to receive the first image representing the first transmitted wavefront and the second image representing the second transmitted wavefront from the camera and determine a characteristic of the test object based at least partially on the first transmitted wavefront and the second transmitted wavefront and a difference between the first relative distance and the second relative distance.

2. The Mach-Zehnder interferometer of claim 1, further comprising:
the at least one processor determines a lens power of the test object based at least partially on the first transmitted wavefront and the second transmitted wavefront and the difference between the first relative distance and the second relative distance.

3. The Mach-Zehnder interferometer of claim 2, wherein the test object has different lens power along different axes or at different zones, and wherein the at least one processor is configured to determine the lens power of the test object for each axis or each zone.

4. The Mach-Zehnder interferometer of claim 2, wherein the at least one processor is configured to determine the lens power of the test object based at least partially on the first transmitted wavefront and the second transmitted wavefront using interferometric power measurements from the first transmitted wavefront and the second transmitted wavefront and using a change in the relative distance between the first relative distance and the second relative distance.

5. The Mach-Zehnder interferometer of claim 2, wherein the at least one processor is further configured to measure a transmitted wavefront from at least one of the first image and the second image.

6. The Mach-Zehnder interferometer of claim 1, wherein the one or more auxiliary lenses is positioned in the test arm before the test object or the one or more auxiliary lenses is positioned in the test arm after the test object.

7. The Mach-Zehnder interferometer of claim 6, wherein the test object re-collimates the second portion of the illumination beam received from the one or more auxiliary lenses if the one or more auxiliary lenses is positioned before the test object or the one or more auxiliary lenses re-collimates the second portion of the illumination beam received from the test object if the one or more auxiliary lenses is positioned after the test object.

8. The Mach-Zehnder interferometer of claim 1, wherein the one or more auxiliary lenses receives the second portion of the illumination beam and produces an affective point source for the test object if the one or more auxiliary lenses is positioned before the test object or the test object receives the second portion of the illumination beam and produces the affective point source for the one or more auxiliary lenses if the one or more auxiliary lenses is positioned after the test object.

9. The Mach-Zehnder interferometer of claim 8, wherein the first relative distance between the test object and the one or more auxiliary lenses places the affective point source at a designed conjugate plane of the test object.

10. The Mach-Zehnder interferometer of claim 1, wherein the test object is one of an intraocular lens, an anidolic optical component, a conformal optical window, a conformal filter, a conformal polarizer, a conformal waveplate, or a diffractive optical element.

11. A method of measuring a test object that is transparent using a Mach-Zehnder interferometer, comprising:
generating an illumination beam;
splitting the illumination beam into a first portion along a reference arm and a second portion a test arm;
transmitting the second portion of the illumination beam through one or more auxiliary lenses and the test object in the test arm;
producing different relative distances between the test object and the one or more auxiliary lenses;
combining the first portion of the illumination beam from the reference arm and the second portion of the illumination beam from the test arm after a single transmission through the test object and the one or more auxiliary lenses to produce a combined beam; and
capturing a first image of the combined beam representing a first transmitted wavefront from the test object produced with a first relative distance between the test object and the one or more auxiliary lenses and a second image of the combined beam representing a second transmitted wavefront from the test object produced with a second relative distance between the test object and the one or more auxiliary lenses; and
determining a characteristic of the test object based at least partially on the first transmitted wavefront and the second transmitted wavefront and a difference between the first relative distance and the second relative distance.

12. The method of claim 11, further comprising:
determining a lens power of the test object based at least partially on the first transmitted wavefront and the second transmitted wavefront and the difference between the first relative distance and the second relative distance.

13. The method of claim 12, wherein the test object has different lens power along different axes or at different zones, and wherein determining the lens power of the test object comprises determining the lens power for each axis or each zone.

14. The method of claim 12, wherein determining the lens power of the test object based at least partially on the first transmitted wavefront and the second transmitted wavefront uses interferometric power measurements from the first transmitted wavefront and the second transmitted wavefront and further uses a change in relative distance between the first relative distance and the second relative distance.

15. The method of claim 12, further measuring a transmitted wavefront from at least one of the first image and the second image.

16. The method of claim 11, wherein the one or more auxiliary lenses is positioned in the test arm before the test object or the one or more auxiliary lenses is positioned in the test arm after the test object.

17. The method of claim 16, wherein the test object re-collimates the second portion of the illumination beam received from the one or more auxiliary lenses if the one or more auxiliary lenses is positioned before the test object or the one or more auxiliary lenses re-collimates the second portion of the illumination beam received from the test object if the one or more auxiliary lenses is positioned after the test object.

18. The method of claim 11, wherein the one or more auxiliary lenses receives the second portion of the illumination beam and produces an affective point source for the test object if the one or more auxiliary lenses is positioned before the test object or the test object receives the second portion of the illumination beam and produces the affective point source for the one or more auxiliary lenses if the one or more auxiliary lenses is positioned after the test object.

19. The method of claim 18, wherein the first relative distance between the test object and the one or more auxiliary lenses places the affective point source at a designed conjugate plane of the test object.

20. The method of claim 11, wherein the test object is one of an intraocular lens, an anidolic optical component, a conformal optical window, a conformal filter, a conformal polarizer, a conformal waveplate, or a diffractive optical element.

* * * * *